United States Patent [19]

Mann

[11] Patent Number: 4,604,604
[45] Date of Patent: Aug. 5, 1986

[54] VAPOR EMITTING WEAR INDICATOR

[75] Inventor: Joseph M. Mann, Ft. Wayne, Ind.

[73] Assignee: International Harvester Company, Chicago, Ill.

[21] Appl. No.: 625,988

[22] Filed: Jun. 29, 1984

[51] Int. Cl.$^4$ .................... B60Q 1/00; G01D 21/00
[52] U.S. Cl. .......................... 340/52 A; 340/590; 116/206; 116/208; 116/211; 116/214
[58] Field of Search ............... 340/52 A, 590, 52 R; 116/200, 206, 208, 211, 214; 188/1.11

[56] References Cited

U.S. PATENT DOCUMENTS

| | | | |
|---|---|---|---|
| 1,755,642 | 4/1930 | Gannon | 116/214 |
| 2,552,271 | 5/1951 | Faus | 116/214 |
| 3,138,224 | 6/1964 | White | 116/208 |
| 4,338,097 | 7/1982 | Turner et al. | 116/208 |

Primary Examiner—Donnie L. Crosland
Attorney, Agent, or Firm—Dennis K. Sullivan; F. David AuBuchon

[57] ABSTRACT

A material wear indicator for a disc brake lining or clutch pad or any other erodible part comprises a vapor substance. Erosion of the part to a predetermined level exposes the substance to an ambient environment or other chemical means. The substance begins to exude an invisible vapor with a specific scent or oder. Alternatively or in combination with a scent emission, visible vapor can be color coded for a fretted part identification or erosion level thereof. The presence of the vapor immediately alerts service personnel of the danger and necessity to replace the worn-out part. The vapor emitting wear indicator does not require any electrical, hydraulic, sound or mechanical connection to any gauge or system and therefore represents one of the cheapest, reliable and most effective ways to indicate the selected level of material abrasion.

12 Claims, 3 Drawing Figures

VAPOR EMITTING WEAR INDICATOR

BACKGROUND OF THE INVENTION

This invention pertains to erodible material wear indicators and more particularly to brake lining or clutch pad wear indicators. At present, sound emitting and electrical wear indicators are commonly utilized in motor vehicle brakes. Sound emitting indicators have an inherent drawback related to necessity to exceed the diesel engine noise and cab acoustical protection. Electrical and hydraulic wear indicators have durability and cost efficiency shortcomings.

The subject vapor emitting wear indicator can be used on disc or drum brakes, vehicle clutches or anywhere else where there is a need to indicate an alarming level or point of material erosion. The novel material wear indicator overcomes the shortcomings of contemporary devices and simplifies manufacture, control and installation process with improved serviceability and increased cost efficiency.

SUMMARY OF THE INVENTION

According to the present invention, a material wear indicator for an erodible structure comprises a vapor emitting substance secured in a place corresponding to a predetermined erosion level of the structure. When a structure wearable surface reaches this level the substance exudes a vapor with distinct scent or color coded smoke.

DESCRIPTION OF THE PREFERRED EMBODIMENT

The invention may be carried into practice in a number of ways but one specific embodiment will be described by way of example only.

Figure 1:
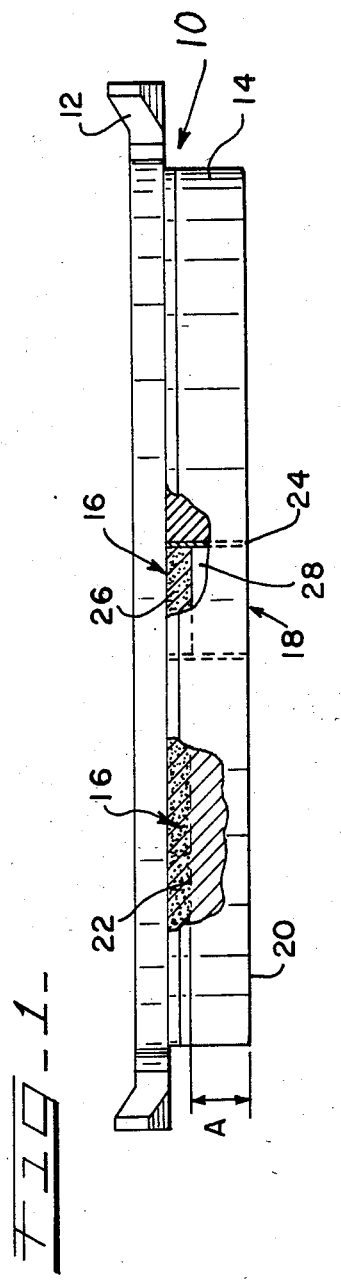
FIG. 1 is partially cross-sectional side view of a disc brake shoe and lining assembly.
Figure 2:
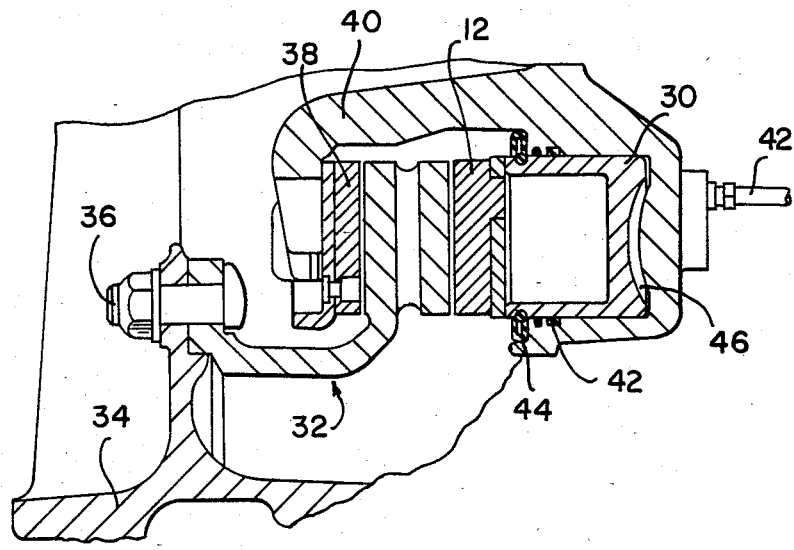
FIG. 2 is a cross-sectional view of the disc brake assembly.
Figure 3:
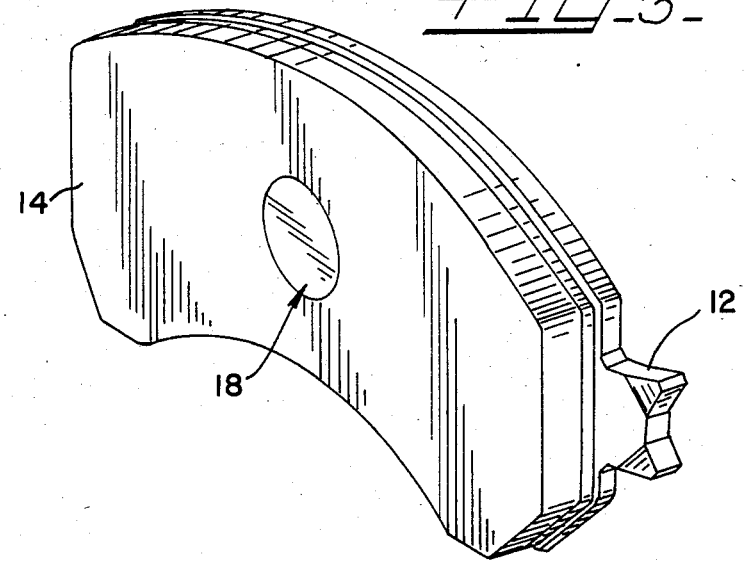
FIG. 3 is a perspective blown-up view of the inboard pad assembly.

Referring now to the drawings wherein reference characters designate like or corresponding parts throughout the several views, there is shown in FIGS. 1, 2 and 3 a disc brake shoe and lining assembly 10. The assembly 10 comprises an inner pad or shoe 12 which is removeably attached to the lining 14. The lining 14 includes a vapor emitting material 16 embedded in a close proximity to the shoe 12. Vapor emitting material 16 can be uniformly spread as a layer inside the lining 14, as shown on the left side of FIG. 1, or as an insertable capsule 18, as shown in the center portion of FIG. 1. The lining wear depth "A" between the lining outer surface 20 and the layer outer surface 22 is predetermined.

A capsule 18 is insertable into the sleeve 24 embedded in the lining 14. Number and location pattern of the capsules can vary. The capsule 18 includes a vapor emitting material 26 disposed near the shoe 12. The space between the vapor emitting layer 26 and the outer surface 20 can be filled with the lining material used in the body of the lining 14, as shown in FIG. 3. It must be understood that the vapor emitting substance can be in a fluid, gaseous, solid or combination thereof state. The substance can be secured to or detached from an erodible structure.

As best shown in FIG. 2, the inner pad 12, attached to the piston 30, frictionally engages with the rotating rotor 32 for retardation thereof. The rotor 32 is rigidly secured to the wheel 34 by bolts 36. The other side of the rotor 32 is engageable with an outboard pad 38 secured to the caliper housing 40. The piston 30 slides within the caliper housing 40. The piston 30 is actuated by hydraulic fluid pressure coming through the hydraulic fluid supply line 42. The seal 42 and dust boot 44 protect the piston chamber 46 from foreign matter penetration thereinto.

Upon engaging a brake pedal the hydraulic fluid coming through the line 42 pressurizes the piston 30 which in turn forces the inner board pad 12 and outboard pad 38 to squeeze the rotating rotor 32, thereby arresting the rotation thereof and, hence, the vehicle wheel 34.

The vapor emission alerts a vehicle operator of the predetermined maximum erosion level of the brake lining and thus facilitates a proper function and safety of the vehicle. The vaporizable or subliming material is embedded in the brake lining as a capsule or a series of capsules, or as a layer impregnating the lining at the predetermined level. The vapor can be made visible or invisible. The invisible vapor exudes a specific odor, when exposed to ambient environment, thereby stimulating a human olfactory organ. The strength of that odor or scent can be increased with further scent material exposure, if necessary. Alternatively or in combination with the odor emission, the visible vapor can be color coded, i.e. smoke of a particular color corresponds either to an eroded part identification or the extent of an erosion thereof.

The same indicator can be applied to any other assembly having a moving part and erodible part complementary engageable therewith. For instance, in a clutch assembly an erodible clutch disc contacts the flywheel and pressure plate to transfer the engine output to the transmission. A built-in or inserted vapor emitting indicator signals attainment of the selected erosion level, thus prompting timely replacement of the clutch disc. Clearly, any other clutch with erasable pads and discs can use this indicator.

The novel wear indicator can be placed in highly inaccessible and not readily observable places and parts. The built-in or insertable indicator is inexpensive, reliable and efficient device which is independent of electrical, hydraulic or other systems, as well as connecting lines, gauges and so forth. The vaporizable or subliming substance can be placed either within and or outside the body of the erodible part. The vapor emission can be activated by a chemical reaction, temperature or other means secured to or independent of the erodible part.

While one embodiment of the invention has been illustrated and described herein, various changes and modifications may be made therein without departing from the spirit of the invention as defined by the scope of the appended claims.

What is claimed is:

1. A material wear indicator for an erodible structure having a wearable surface comprising:
   a vapor emitting means located in said erodible structure in a place beneath said wearable surface corresponding to a selected maximum erosion level of said wearable surface;

said vapor emitting means exuding a specific vapor upon said wearable surface of said structure being sufficiently eroded to expose said vapor emitting means.

2. The wear indicator according to claim 1, and said erodible structure being a brake lining for a disc brake mounted on a motor vehicle wheel;

said wearable surface frictionally engageable with an associated wheel part for retardation thereof.

3. The wear indicator according to claim 1, and said vapor emitting means being included in a capsule insertable into said erodible structure at a predetermined location.

4. The wear indicator according to claim 1, and said erodible structure comprising a layer of said vapor emitting means embedded therein at said maximum erosion level.

5. The wear indicator according to claim 1, and vapor emission strength being proportional to an exposure level of said vapor emitting means.

6. The wear indicator according to claim 4, and said layer being essentially coextensive with said wearable surface.

7. The wear indicator according to claim 1, and said vapor comprising odoriferous substance stimulating an olfactory organ.

8. The wear indicator according to claim 1, and said vapor comprising a color coded smoke identifying said erodible structure.

9. The wear indicator according to claim 8, and said smoke identifying a level of erosion of said erodible structure.

10. The invention according to claim 3, and said capsule comprising a material of said wearable surface.

11. A brake lining wear indicator for a motor vehicle brake, comprising:

a brake lining frictionally engageable with an associated motor vehicle wheel for impeding rotation thereof; and said brake lining comprising a layer of vapor emitting means embedded therein at a predetermined distance from a wheel engagement surface of said brake lining for emitting a vapor upon said brake lining being sufficiently worn that said vapor emitting means becomes exposed.

12. The wear indicator according to claim 11, and said vapor comprising a color smoke identifying an erosion level of said brake lining.

* * * * *